US012791704B2

(12) United States Patent
Lee et al.

(10) Patent No.: US 12,791,704 B2
(45) Date of Patent: Nov. 10, 2026

(54) APPARATUS FOR DRIVER ASSISTANCE AND METHOD OF CONTROLLING THE SAME

(71) Applicant: HL KLEMOVE CORP., Incheon (KR)

(72) Inventors: Jingu Lee, Gyeonggi-do (KR); Junghwan Choi, Seoul (KR); Hanbyul Lee, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 271 days.

(21) Appl. No.: 18/373,679

(22) Filed: Sep. 27, 2023

(65) Prior Publication Data

US 2024/0230888 A1 Jul. 11, 2024

(30) Foreign Application Priority Data

Jan. 5, 2023 (KR) ........................ 10-2023-0001744

(51) Int. Cl.
*G01S 13/931* (2020.01)
*G01S 7/35* (2006.01)
*G01S 13/58* (2006.01)

(52) U.S. Cl.
CPC ............ *G01S 13/931* (2013.01); *G01S 7/356* (2021.05); *G01S 13/584* (2013.01)

(58) Field of Classification Search
CPC ...... G01S 13/931; G01S 7/356; G01S 13/584; G01S 7/354; G01S 13/343; G01S 13/426;
(Continued)

(56) References Cited

U.S. PATENT DOCUMENTS

2004/0150549 A1* 8/2004 Kumon .................. G01S 13/34 342/146
2006/0055587 A1* 3/2006 Mitsumoto ............. G01S 13/42 342/107
(Continued)

FOREIGN PATENT DOCUMENTS

CN 111641463 9/2020
KR 10-2020-0028137 3/2020
(Continued)

OTHER PUBLICATIONS

Office Action (1st) dated Feb. 2, 2026 for Korean Patent Application No. 10-2023-0001744 and its English translation provided by Applicant's foreign counsel.

*Primary Examiner* — Tuan C To
*Assistant Examiner* — Dominick Mulder
(74) *Attorney, Agent, or Firm* — WOMBLE BOND DICKINSON (US) LLP

(57) ABSTRACT

An apparatus for driver assistance includes a radar installed on a vehicle, having a sensing area outside the vehicle, and configured to provide object data, and a controller configured to identify a distance to an object around the vehicle and a moving speed of the object based on processing the object data. The radar includes transmission antennas, reception antennas, and a signal processor configured to provide transmission signals to transmission antennas to transmit transmission radio waves and acquire reception signals received by the reception antennas. The signal processor determines an angle to the object based on at least two signals of the reception signals, subtracts a phase corresponding to the angle to the object from phases of the reception signals, and identifies a phase difference between the transmission radio waves based on phase-subtracted signals including the subtracted phases.

12 Claims, 13 Drawing Sheets

(58) Field of Classification Search

CPC .......... G01S 13/4454; G01S 7/02; G01S 7/40; G01S 13/003; B60W 10/04; B60W 10/18; B60W 10/20; B60W 2554/4042; B60W 2554/4043; B60W 2554/80; B60W 40/02; B60W 2420/408

USPC .......................................................... 701/23

See application file for complete search history.

(56) References Cited

U.S. PATENT DOCUMENTS

| | | | | |
|---|---|---|---|---|
| 2006/0220951 | A1* | 10/2006 | Thome | G01S 7/288 342/174 |
| 2010/0075618 | A1* | 3/2010 | Isaji | G01S 13/931 455/90.1 |
| 2014/0168006 | A1* | 6/2014 | Sickinger | G01S 7/4021 342/174 |
| 2015/0080725 | A1* | 3/2015 | Wegner | A61B 8/14 600/443 |
| 2015/0369912 | A1* | 12/2015 | Kishigami | G01S 13/34 342/104 |
| 2017/0117946 | A1* | 4/2017 | Lee | G01S 3/72 |
| 2017/0363732 | A1* | 12/2017 | Ishimori | G01S 7/354 |
| 2018/0321378 | A1* | 11/2018 | Sudhakar | G01S 13/4454 |
| 2019/0285742 | A1* | 9/2019 | Wang | G01S 7/4004 |
| 2019/0391249 | A1* | 12/2019 | Takeuchi | G01S 13/536 |
| 2020/0081108 | A1* | 3/2020 | Lee | G01S 13/343 |
| 2020/0081110 | A1* | 3/2020 | Nam | G01S 13/42 |
| 2020/0116850 | A1* | 4/2020 | Santra | A61B 5/0507 |
| 2020/0132812 | A1* | 4/2020 | Dvorecki | G01S 13/931 |
| 2020/0158821 | A1* | 5/2020 | Doare | G01S 7/4013 |
| 2020/0174098 | A1 | 6/2020 | Lang et al. | |
| 2021/0072350 | A1* | 3/2021 | Loesch | G01S 13/343 |
| 2021/0364622 | A1* | 11/2021 | Roger | G01S 13/584 |
| 2021/0364626 | A1* | 11/2021 | Schoor | G01S 7/354 |
| 2022/0146660 | A1* | 5/2022 | Singh | G01S 13/426 |
| 2022/0357443 | A1* | 11/2022 | Choi | G01S 13/68 |
| 2023/0228886 | A1* | 7/2023 | Yu | G01S 19/21 342/357.28 |

FOREIGN PATENT DOCUMENTS

| | | |
|---|---|---|
| KR | 10-2143948 | 8/2020 |
| KR | 10-2020-0124838 | 11/2020 |

* cited by examiner

APPARATUS FOR DRIVER ASSISTANCE AND METHOD OF CONTROLLING THE SAME

CROSS-REFERENCE TO RELATED APPLICATION

This application claims the benefit of Korean Patent Application No. 10-2023-0001744, filed on Jan. 5, 2023 in the Korean Intellectual Property Office, the disclosure of which is incorporated herein by reference.

BACKGROUND

1. Field

Embodiments of the present disclosure relate to an apparatus for traveling assistance including a radar and a method of controlling the same.

2. Description of the Related Art

Vehicles are the most common transportation in modern society, and the number of people using the vehicles is increasing. Although there are advantages such as easy long-distance movement and comfortable living with the development of a vehicle technology, a problem that road traffic conditions deteriorate and traffic congestion becomes serious in densely populated places such as Korea often occurs.

Recently, research on vehicles equipped with an advanced driver assist system (ADAS) for actively providing information on a vehicle condition, a driver condition, and/or a surrounding environment in order to reduce a driver's burden and enhance convenience is actively progressing.

As examples of ADASs mounted on the vehicle, there are lane departure warning (LDW), lane keeping assist (LKA), high beam assist (HBA), autonomous emergency braking (AEB), traffic sign recognition (TSR), adaptive cruise control (ACC), blind spot detection (BSD), etc.

An ADAS may collect information on a surrounding environment and process the collected information. In addition, the ADAS may recognize objects and design a route for the vehicle to travel based on processing the collected information.

As described above, since a mechanical connection between a steering wheel and a rack bar is omitted, a separate sensor for detecting a linear motion of the rack bar is required.

SUMMARY

Therefore, it is an aspect of the present disclosure to provide an apparatus for traveling assistance including a radar and a method of controlling the same.

Additional aspects of the disclosure will be set forth in part in the description which follows and, in part, will be obvious from the description, or may be learned by practice of the disclosure.

In accordance with one aspect of the present disclosure, an apparatus for driver assistance includes a radar installed on a vehicle, having a sensing area outside the vehicle, and configured to provide object data, and a controller configured to identify a distance to an object around the vehicle and a moving speed of the object based on processing the object data. The radar includes a plurality of transmission antennas, a plurality of reception antennas, and a signal processor configured to provide transmission signals to the plurality of transmission antennas to transmit a plurality of transmission radio waves and acquire a plurality of reception signals received by the plurality of reception antennas. The signal processor determines an angle to the object based on at least two signals of the plurality of reception signals, subtracts a phase corresponding to the angle to the object from phases of the plurality of reception signals, and identifies a phase difference between the plurality of transmission radio waves based on a plurality of phase-subtracted signals including the subtracted phases.

The signal processor may correct the phases of the plurality of reception signals based on the phase difference between the plurality of transmission radio waves.

A minimum distance between the plurality of transmission antennas may be greater than a maximum distance between the plurality of reception antennas.

The plurality of transmission radio waves may include a first transmission radio wave and a second transmission radio wave. The plurality of reception signals may include first sub-signals corresponding to the first transmission radio wave and second sub-signals corresponding to the second transmission radio wave.

The signal processor may identify a phase difference between first phases of the first sub-signals and second phases of the second sub-signals.

The signal processor may identify whether each of a phase error of the first phases and a phase error of the second phases is smaller than a predetermined allowable error.

The transmission signals transmitted from the plurality of transmission antennas may be phase-modulated or time-modulated.

The plurality of transmission antennas may radiate transmission signals whose frequencies linearly vary in response to a chirp signal, and the plurality of reception antennas may receive reflected signals reflected from the object.

The radar may further include a signal processing circuit configured to provide an intermediate frequency signal, which has been generated based on mixing the transmission signal and the reception signal, to the signal processor.

The signal processor may transform the intermediate frequency signal into frequency domain data using a first fast Fourier transform, and transform the frequency domain data into phase domain data using a second fast Fourier transform.

In accordance with another aspect of the present disclosure, a method of controlling an apparatus for driver assistance including a radar having a plurality of transmission antennas and a plurality of reception antennas includes providing transmission signals to the plurality of transmission antennas to transmit a plurality of transmission radio waves, acquiring a plurality of reception signals received by the plurality of reception antennas, determining an angle to an object based on at least two signals of the plurality of reception signals, subtracting a phase corresponding to the angle to the object from phases of the plurality of reception signals, and identifying a phase difference between the plurality of transmission radio waves based on a plurality of phase-subtracted signals including the subtracted phases.

The method may further include correcting the phases of the plurality of reception signals based on the phase difference between the plurality of transmission radio waves.

The plurality of transmission radio waves may include a first transmission radio wave and a second transmission radio wave. The plurality of reception signals may include first sub-signals corresponding to the first transmission radio wave and second sub-signals corresponding to the second transmission radio wave.

The identifying of the phase difference between the plurality of transmission radio waves may include identifying a phase difference between first phases of the first sub-signals and second phases of the second sub-signals.

The method may further include identifying whether each of a phase error of the first phases and a phase error of the second phases is smaller than a predetermined allowable error.

The method may further include phase-modulating or time-modulating the transmission signals transmitted from the plurality of transmission antennas.

The method may further include radiating, by the plurality of transmission antennas, the transmission signals whose frequencies linearly vary in response to a chirp signal, and receiving, by the plurality of reception antennas, reflected signals reflected from the object.

The method may further include transforming the intermediate frequency signal into frequency domain data using a first fast Fourier transform, and transforming the frequency domain data into phase domain data using a second fast Fourier transform.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
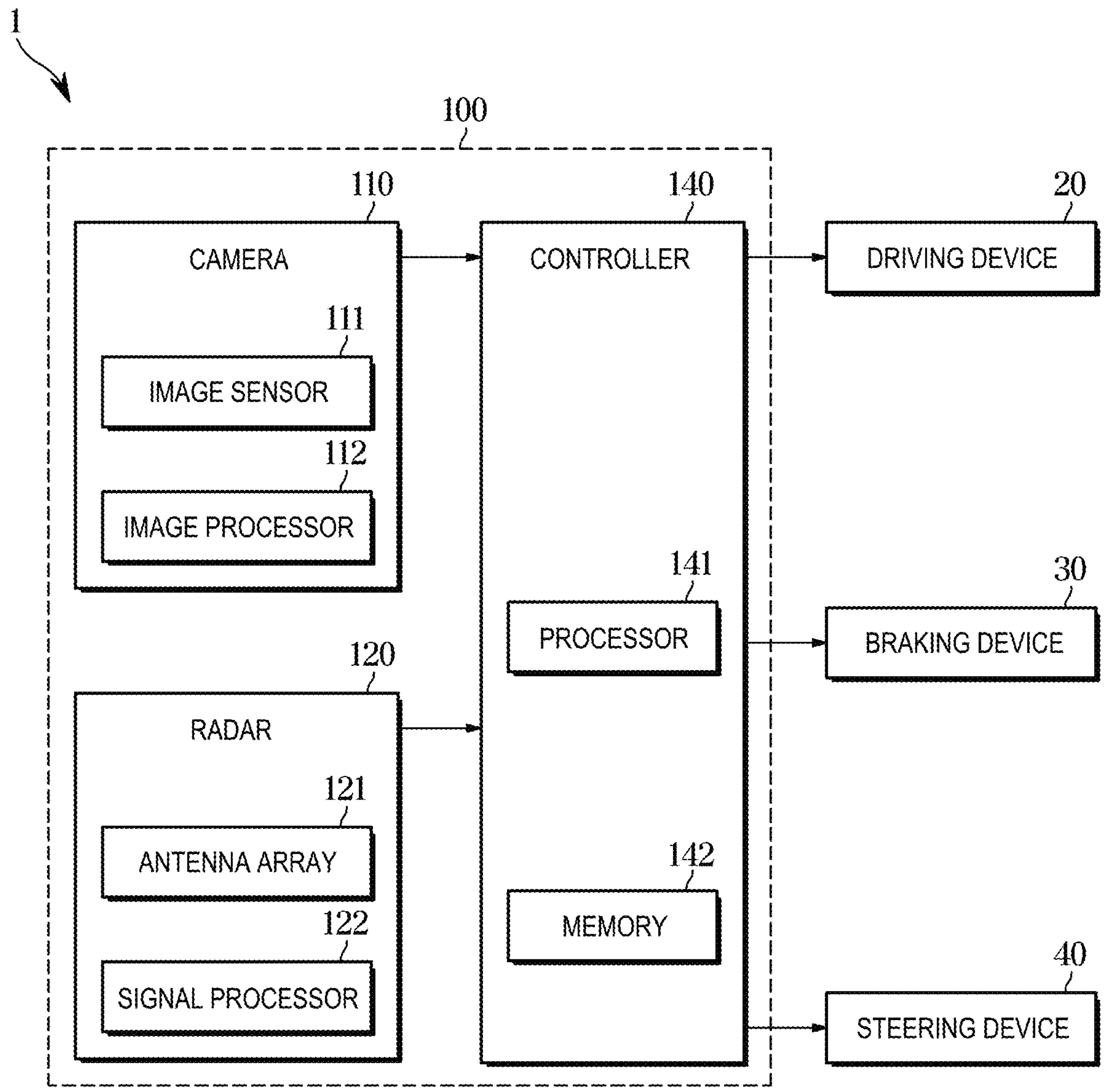
FIG. 1 is a view illustrating configurations of a vehicle and an apparatus for traveling assistance according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
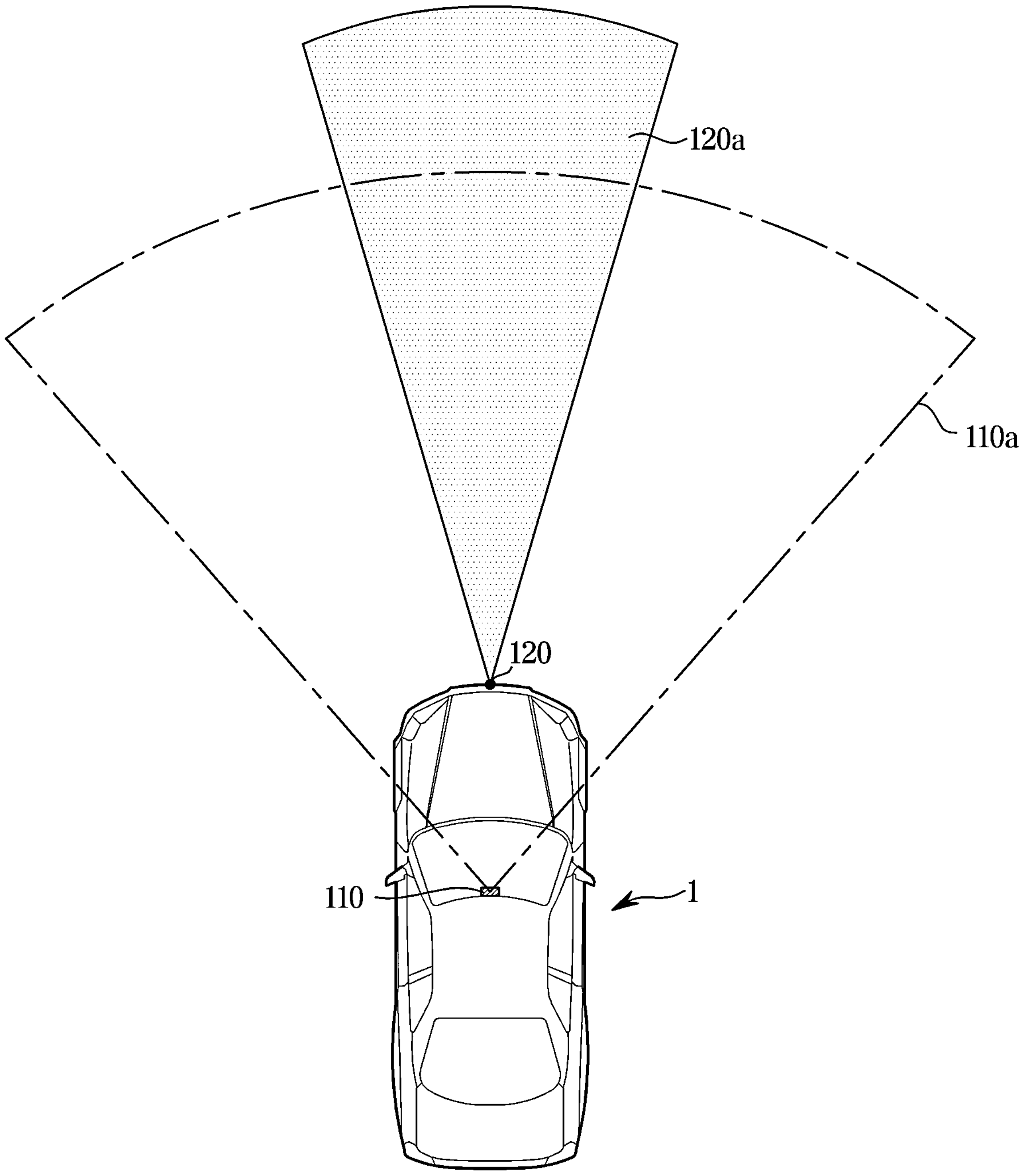
FIG. 2 is a view illustrating fields of view of a camera and a radar included in the apparatus for traveling assistance according to one embodiment.

FIG. 1 is a view illustrating a configuration of a vehicle according to one embodiment. FIG. 2 is a view illustrating fields of view of a camera and a radar included in the apparatus for traveling assistance according to one embodiment.

As illustrated in FIG. 1, a vehicle 1 includes a driving device 20, a braking device 30, a steering device 40, and an apparatus 100 for traveling assistance. The driving device 20, the braking device 30, the steering device 40, and/or the apparatus 100 for traveling assistance may communicate with one another via a vehicle communication network NT For example, the electric devices 20, 30, 40, and 100 included in the vehicle 1 may transmit or receive data via Ethernet, media oriented systems transport (MOST), Flexray, controller area network (CAN), local interconnect network (LIN), or the like.

The driving device 20 may move the vehicle 1 and include, for example, an engine, an engine management system (EMS), a transmission, and a transmission control unit (TCU). The engine may generate a power for the vehicle 1 to travel, and the EMS may control the engine in response to a driver's acceleration intention through an accelerator pedal or a request of the apparatus 100 for traveling assistance. The transmission may transmit the power generated by the engine to wheels for deceleration, and the TCU may control the transmission in response to a driver's transmission instruction through a transmission lever and/or a request of the apparatus 100 for traveling assistance.

The braking device 30 may stop the vehicle 1 and include, for example, a brake caliper and a brake control module (EBCM). The brake caliper may decelerate the vehicle 1 or stop the vehicle 1 using friction with a brake disc, and the EBCM may control the brake caliper in response to the driver's braking intention through a brake pedal and/or a request of the apparatus 100 for traveling assistance. For example, the EBCM may receive a deceleration request including a deceleration from the apparatus 100 for traveling assistance and electrically or hydraulically control the brake caliper so that the vehicle 1 decelerates depending on the requested deceleration.

The steering device 40 may include an electronic power steering control module (EPS). The steering device 40 may change a traveling direction of the vehicle 1, and the EPS may assist an operation of the steering device 40 so that the driver may easily manipulate a steering wheel in response to the driver's steering intention through the steering wheel. In addition, the EPS may control the steering device in response to a request of the apparatus 100 for traveling assistance. For example, the EPS may receive a steering request including a steering torque from the apparatus 100 for traveling assistance and control the steering device to steer the vehicle 1 depending on the requested steering torque.

In addition, the apparatus 100 for traveling assistance may communicate with the driving device 20, the braking device 30, and the steering device 40 via the vehicle communication network.

The apparatus 100 for traveling assistance may provide various functions for safety to the driver. For example, the apparatus 100 for traveling assistance may provide lane departure warning (LDW), lane keeping assist (LKA), high beam assist (HBA), autonomous emergency braking (AEB), traffic sign recognition (TSR), adaptive cruise control (ACC), blind spot detection (BSD), and the like.

The apparatus 100 for traveling assistance may include a camera 110, a radar 120, and a controller 140. The camera 110, the radar 120, and the controller 140 may not correspond to essential components of the apparatus 100 for traveling assistance. For example, at least one of the camera 110, the radar 120, or the controller 140 may be omitted from the apparatus 100 for traveling assistance, and a detector (e.g., light detection and ranging (LiDAR)) capable of detecting objects around the vehicle 1 may also be added to the apparatus 100 for traveling assistance.

The camera 110 may capture surroundings of the vehicle 1 and acquire image data of the surroundings of the vehicle 1. For example, as illustrated in FIG. 2, the camera 110 may be installed on a front windshield of the vehicle 1 and may have a forward field of view 110*a* of the vehicle 1.

The camera 110 may include a plurality of lenses and an image sensor 111. The image sensor 111 may include a plurality of photodiodes for converting light into electrical signals, and the plurality of photodiodes may be arranged in the form of a two-dimensional matrix. The image sensor 111 may output image data including images of the objects around the vehicle 1.

The camera 110 may include an image processor 112 for processing the image data. For example, the image processor 112 may process the image data to identify relative positions (distances from the vehicle and angles with respect to the traveling direction of the vehicle) and classification (e.g., whether the objects are other vehicles, pedestrians, cyclists, or the like) of the front objects of the vehicle 1. The image processor 112 may output first object data based on processing the image data. The first object data may include information on other vehicles, pedestrians, cyclists, or lane line markers (markers for distinguishing lanes) positioned around the vehicle 1.

The camera 110 may be electrically connected to the controller 140. For example, the camera 110 may be connected to the controller 140 via the vehicle communication network NT or connected to the controller 140 via a hard wire. The camera 110 may transmit the first object data around the vehicle 1 to the controller 140.

The radar 120 may transmit transmission radio waves to the outside of the vehicle 1 and detect external objects of the vehicle 1 based on reflected radio waves reflected from the external objects. For example, as illustrated in FIG. 2, the radar 120 may be installed on a grille or bumper of the vehicle land may have a forward field of sensing 120*a* of the vehicle 1.

The radar 120 may include an antenna array 121 including a transmission antenna (or a transmission antenna array) for radiating transmission radio waves to the surroundings of the vehicle 1 and a reception antenna (or a reception antenna array) for receiving reflected radio waves reflected from objects. The radar 120 may acquire radar data from the transmission radio waves transmitted by the transmission antenna and the reflected radio waves received by the reception antenna.

The radar 120 may include a signal processor 122 for processing the radar data. The signal processor 122 may identify relative positions and relative velocities of the front objects based on the radar data. The signal processor 122 may output second object data based on processing the radar data. The second object data may include position information (e.g., distance information) and/or speed information of the front objects of the vehicle 1.

The radar 120 may be connected to the controller 140 via, for example, the vehicle communication network NT or the hard wire and may transmit the radar data to the controller 140.

The controller 140 may be electrically connected to the camera 110 and/or the radar 120. In addition, the controller

140 may be connected to the driving device 20, the braking device 30, and the steering device 40 via the vehicle communication network NT.

The controller 140 may process the first object data of the camera 110 and/or the second object data of the radar 120 and provide control signals to the driving device 20, the braking device 30, and/or the steering device 40.

The controller 140 may include a memory 142 and a processor 141.

The memory 142 may store programs and/or data for processing the first object data and/or the second object data. In addition, the memory 142 may store programs and/or data for generating driving, braking, and steering signals.

The memory 142 may temporarily store the first object data received from the camera 110 and/or the second object data received from the radar 120 and temporarily store the results of processing the first object data and/or the second object data of the processor 141.

The memory 142 may include not only volatile memories such as a static random access memory (SRAM) and a dynamic RAM (DRAM) but also non-volatile memories such as a flash memory, a read only memory (ROM), and an erasable programmable ROM (EPROM).

The processor 141 may process the first object data of the camera 110 and/or the second object data of the radar 120. Based on processing the object data, the processor 141 may provide the driving signal, the braking signal, and/or the steering signal for controlling the driving device 20, the braking device 30, and/or the steering device 40, respectively. For example, the processor 141 may include a micro controller unit (MCU) for processing the first object data of the camera 110 and/or the second object data of the radar 120 and generating the driving, braking, and steering signals.

The processor 141 may fuse the first object data and/or the second object data and perform sensor fusion for detecting nearby objects of the vehicle 1. The processor 141 may output "object data" by performing the sensor fusion. For example, the processor 141 may match objects identified based on the second object data with objects identified based on the first object data and identify classification, relative positions, and relative velocities of the nearby objects of the vehicle 1 based on matching the objects.

The processor 141 may evaluate risk of a collision between the vehicle 1 and the nearby objects based on the relative positions and relative velocities of the nearby objects of the vehicle 1. For example, the processor 141 may calculate a time to collision (TTC) (or a distance to collision (DTC)) between the vehicle 1 and the nearby object based on the position (distance) and relative speed of the nearby object of the vehicle 1 and evaluate the risk of collision between the vehicle 1 and the nearby object based on the TTC. The processor 141 may determine that the shorter the TTC, the higher the risk of collision.

The processor 141 may select a target object among the nearby objects of the vehicle 1 based on the risk of collision. For example, the processor 141 may select the target object based on the TTCs between the vehicle 1 and the nearby objects.

The processor 141 may generate the driving signal, the braking signal, or the steering signal based on risk of a collision with the target object. For example, the processor 141 may warn a driver of a collision or transmit the braking signal to the braking device 30 based on a comparison between a reference time and the TTCs between the vehicle 1 and the target objects. In addition, the processor 141 may transmit the steering signal to the steering device 40 in order to avoid the collision with the target object based on the comparison between the reference time and the TTCs between the vehicle 1 and the target objects.

Hereinafter, configurations and operations of the radar 120 and the signal processor 122 will be described in more detail.

Figure 3:
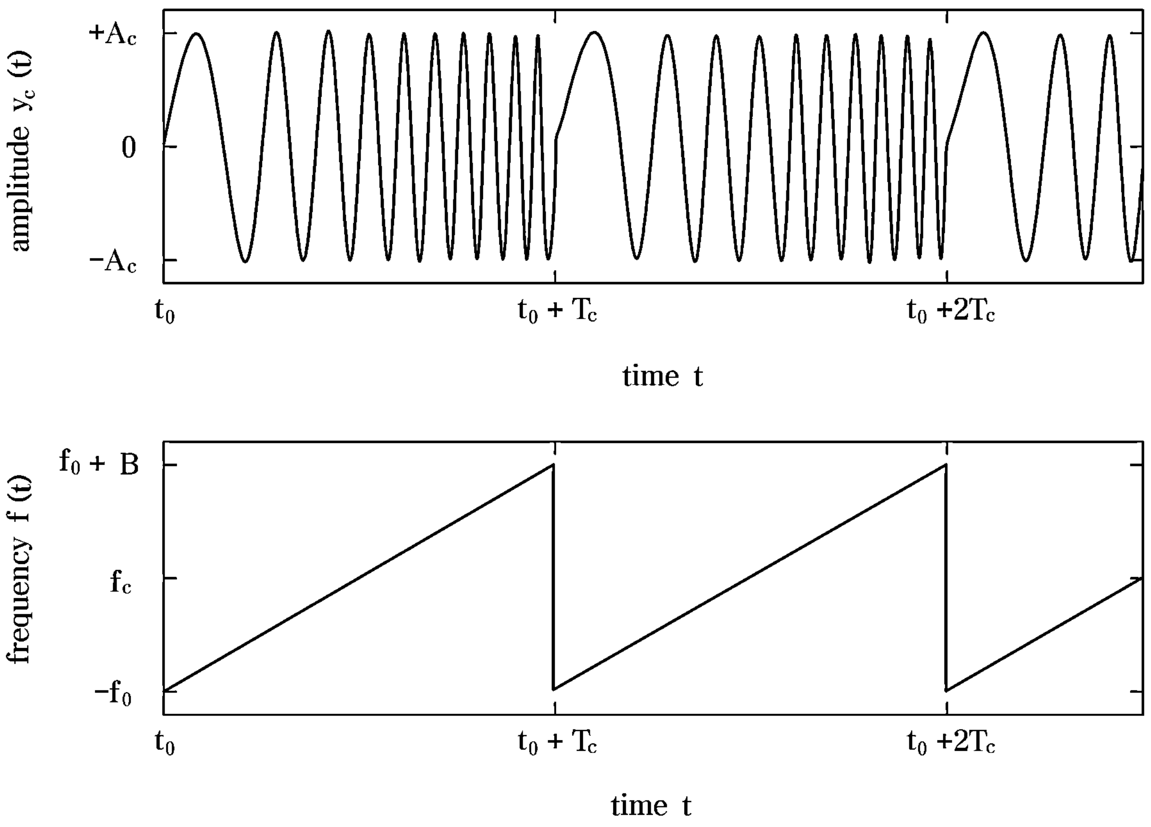
FIG. 3 is a view illustrating one example of radio waves transmitted by the apparatus for traveling assistance according to one embodiment.

FIG. 3 is a view illustrating one example of radio waves transmitted by the apparatus for traveling assistance according to one embodiment.

The radar 120 may include, for example, a frequency-modulated continuous-wave (FMCW) type radar for transmitting a series of linear chirps.

The FMCW type radar 120 may transmit the chirps through the antenna array 121. The chirp may include a sine wave or a sinusoidal wave whose frequency increases or decreases over time.

In particular, as illustrated in FIG. 3, the linear chirp may include a sine wave or a sinusoidal wave whose frequency linearly increases or decreases over time.

A frequency of the linear chirp illustrated in FIG. 3 can be expressed as [Equation 1].

$$f(t) = f_0 + \frac{B}{T_c}(t - t_0) = f_0 + S(t - t_0) \quad \text{[Equation 1]}$$

Here, $f_0$ denotes a start frequency at a time point $t_0$, B denotes a modulation width (i.e., bandwidth) of a frequency, and $T_c$ denotes a frequency modulation time of the chirp. S denotes a frequency change rate or a frequency slope.

In addition, since a derivative of a time with respect to a phase Φ is an angular frequency, a time function corresponding to a phase of a transmission signal may be an integral of a frequency function. Therefore, a change in the phase Φ of the chirp can be expressed as [Equation 2].

$$\phi(t + \Delta t) \simeq \phi(t) + 2\pi f(t)\Delta t \quad \text{[Equation 2]}$$

Here, Φ denotes a phase of the linear chirp, and f(t) denotes a frequency of the linear chirp.

Using [Equation 2], the phase Φ of the linear chirp can be expressed as [Equation 3].

$$\phi(t) = \phi_0 + 2\pi \int_{t_0}^{t} f(\tau)d\tau = \phi_0 + 2\pi\left[f_0(t - t_0) + \frac{B}{2T_c}(t^2 - t_0^2)\right] \quad \text{[Equation 3]}$$

Here, Φ denotes the phase of the linear chirp, and f(t) denotes the frequency of the linear chirp. $t_0$ denotes the start time, $f_0$ denotes a start frequency, and $\Phi_0$ denotes an initial phase. In addition, B denotes a bandwidth of the linear chirp, and $T_c$ denotes a modulation time of the linear chirp.

Using [Equation 3], the phase Φ with respect to the time can be expressed as [Equation 4].

$$y_c(t) = v_{TX}(t) = A_c \sin\left(\phi_0 + 2\pi f_0 t + \pi\frac{B}{T_c}(t - mT_c)^2\right) \quad \text{[Equation 4]}$$

Here, $y_c$ denotes a linear chirp function, $A_c$ denotes an amplitude of the linear chirp, and m denotes an $m^{th}$ chirp.

As illustrated in FIG. 3, the radar 120 may transmit the linear chirp expressed as [Equation 4].

A transmission chirp transmitted from the radar 120 may be mixed with a reception chirp reflected from an object. At this time, the reception chirp may be attenuated and delayed while being reflected from the object and propagated.

Due to such a time delay, a frequency of the reception chirp may be different from a frequency of the transmission chirp. Since the frequency of the transmission chirp linearly varies over time, the frequency of the reception chirp delayed during reflection may be different from the frequency of the transmission chirp. In addition, a difference between the frequency of the transmission chirp and the frequency of the reception chirp may be proportional to a distance between the vehicle 1 and a reflective object.

The signal processor 122 of the radar 120 may identify the distance between the vehicle 1 and the reflective object based on the difference between the frequency of the transmission chirp and the frequency of the reception chirp.

Figure 4:
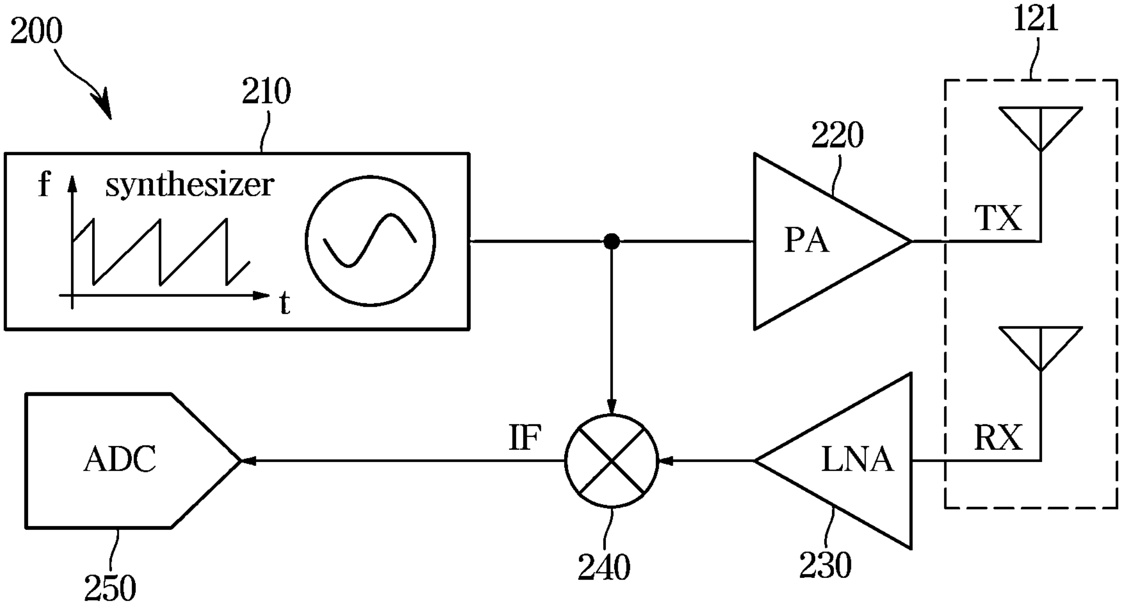
FIG. 4 is a view illustrating a signal processing circuit included in the apparatus for traveling assistance according to one embodiment.

FIG. 4 is a view illustrating a signal processing circuit included in the apparatus for traveling assistance according to one embodiment.

The radar 120 may further include a signal processing circuit 200 for processing an analog signal received by the antenna array 121.

The signal processing circuit 200 may acquire an intermediate frequency signal representing the difference between the frequency of the transmission chirp and the frequency of the reception chirp based on processing the analog signal. The signal processing circuit 200 may convert the acquired intermediate frequency signal into a digital signal and provide the digitalized intermediate frequency signal to the signal processor 122.

The signal processing circuit 200 may include a synthesizer 210, a power amplifier 220, a low noise amplifier 230, a frequency mixer 240, and/or an analog-to-digital converter (ADC) 250. The synthesizer 210, the power amplifier 220, the low noise amplifier 230, the frequency mixer 240, and the ADC 250 do not correspond to essential components of the signal processing circuit 200, and at least some thereof may be omitted.

The synthesizer 210 may generate a linear chirp signal in which a plurality of linear chirps are consecutive. The chirp signal generated by the synthesizer 210 can be expressed as [Equation 4].

The power amplifier 220 may amplify the chirp signal generated by the synthesizer 210.

The amplified chirp signal may be transmitted by the transmission antenna (or the transmission antenna array) of the antenna array 121. In addition, the reception antenna (or the reception antenna array) of the antenna array 121 may receive the chirp signal reflected from the object.

The low noise amplifier 230 may amplify the chirp signal received by the reception antenna.

The frequency mixer 240 may mix the chirp signal generated by the synthesizer 210 with the received chirp signal. The frequency mixer 240 may output the intermediate frequency signal by mixing the transmission chirp signal with the reception chirp signal. The intermediate frequency signal output from the frequency mixer 240 may include information on the object.

The ADC 250 may convert the intermediate frequency signal output from the frequency mixer 240 into a digital signal and provide the converted digital signal to the signal processor 122.

The signal processor 122 may receive the digital signal representing the intermediate frequency signal from the ADC 250 and process the received digital signal.

The signal processor 122 may identify a distance to the reflective object and a moving speed of the reflective object based on processing the digital signal.

Figure 5A:
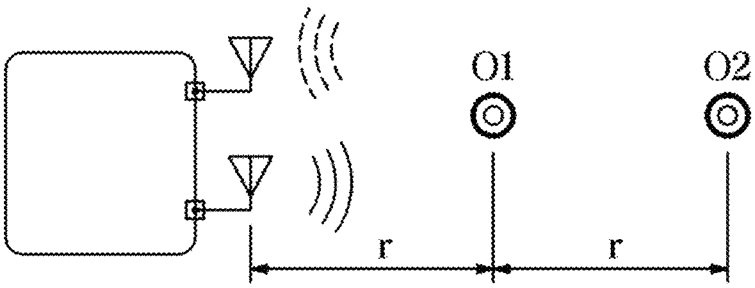
FIGS. 5A, 5B and 5C are a view illustrating one example of a transmission chirp signal and a reception chirp signal of the apparatus for traveling assistance according to one embodiment.
Figure 5B:
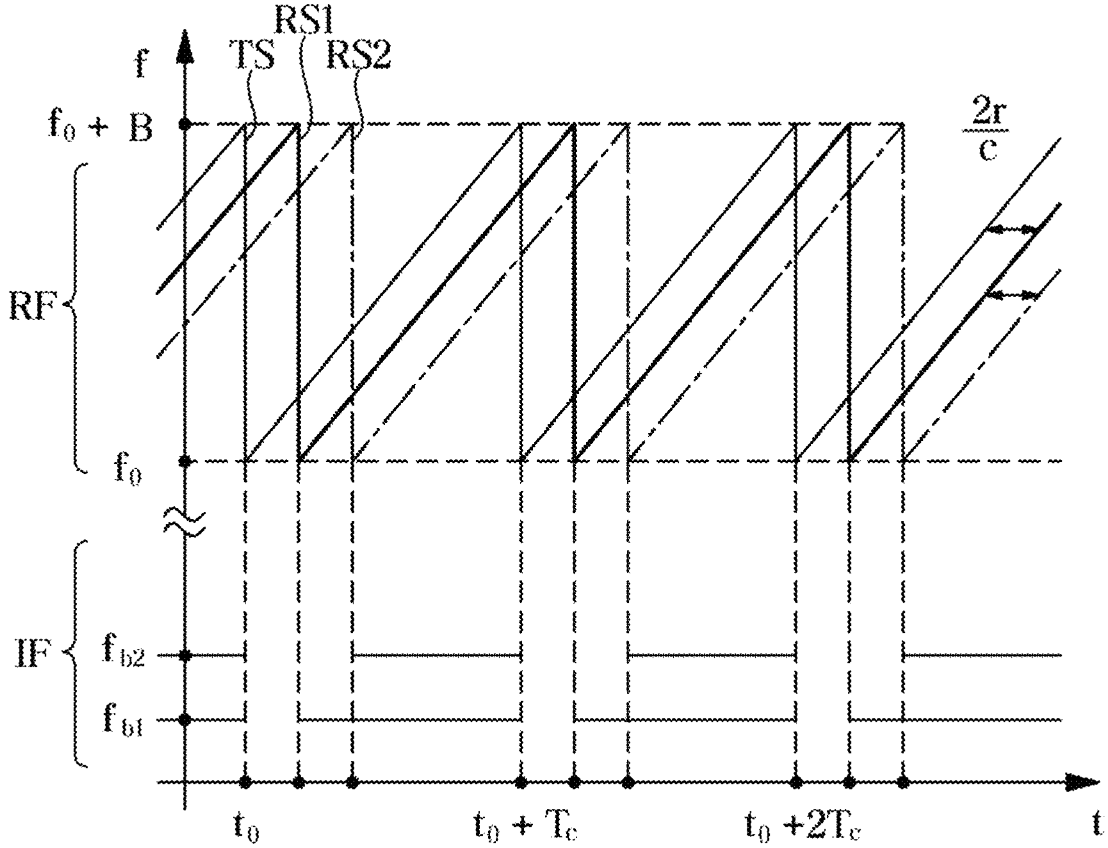
Figure 5C:
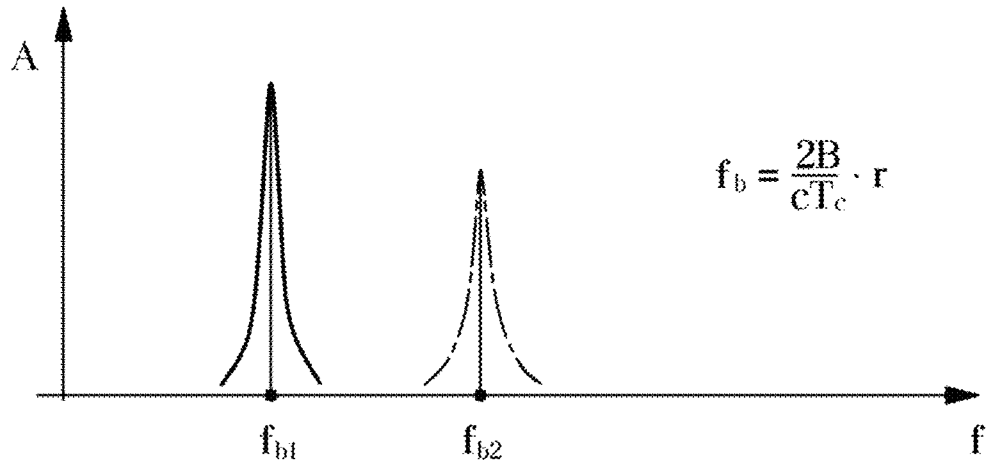

FIGS. 5A, 5B and 5C are a view illustrating one example of a transmission chirp signal and a reception chirp signal of the apparatus for traveling assistance according to one embodiment.

Since a frequency of the signal (intermediate frequency signal) mixed by the frequency mixer 240 is a frequency corresponding to a difference between instantaneous frequencies and is the delayed signal of the transmission chirp signal generated by the frequency mixer 240 and the synthesizer 210, the intermediate frequency may include a frequency component proportional to the delay of the reception chirp signal.

For example, as illustrated in FIGS. 5A, 5B and 5C, a transmission chirp signal TS transmitted from the antenna array 121 may be reflected from a first object O1 and a second object O2. The antenna array 121 may receive a first reception chirp signal RS1 reflected from the first object O1 and a second reception chirp signal RS2 received by the second object O2.

A frequency of a mixed signal of the transmission chirp signal TS and the first reception chirp signal RS1 may be a first intermediate frequency $f_{b1}$, and a frequency of a mixed signal of the transmission chirp signal TS and the second reception chirp signal RS2 may be a second intermediate frequency $f_{b2}$.

The frequency of the mixed signal may correspond to a delay between the transmission chirp signal and the reception chirp signal. Specifically, the frequency of the mixed signal can be expressed as [Equation 5].

$$f_b = \frac{2rS}{c} = \frac{2B}{cT_c} \cdot r \quad \text{[Equation 5]}$$

Here, $f_b$ denotes a frequency of the mixed signal, r denotes a distance to the reflective object, c denotes a speed of light, and S denotes a frequency slope of the transmission chirp signal. In addition, $T_c$ denotes a modulation time, and B denotes a bandwidth of the transmission chirp signal.

The delay between the transmission chirp signal and the reception chirp signal may be equal to a round-trip delay time to the object. In addition, a difference between the frequency of the transmission chirp signal and the frequency of the reception chirp signal may correspond to the round-trip delay time.

The distance r to the object can be expressed as [Equation 6].

$$r = \frac{cf_b}{2S} = \frac{cT_c}{2B} \cdot f_b \quad \text{[Equation 6]}$$

Here, r denotes the distance to the reflective object, c denotes the speed of light, and S denotes the frequency slope of the transmission chirp signal. $T_c$ denotes the modulation time, B denotes the bandwidth of the transmission chirp signal, and $f_b$ denotes the intermediate frequency of the signal mixed by the frequency mixer 240.

In addition, initial phases of all components of the intermediate frequency signal may be a difference between a phase of the transmission chirp signal and a phase of the reception chirp signal at the start of the intermediate frequency signal.

The radar 120 may consecutively transmit a plurality of chirp signals at uniform intervals in order to identify a moving speed of a moving object.

While the object is moving, a distance measurement through the round-trip delay of the chirp signal is affected by compression or elongation of a signal known as the Doppler effect.

Spatial displacement of the object may occur due to the movement of the object while the plurality of chirp signals are consecutively transmitted.

The spatial displacement of the object may affect both the frequency and phase of the intermediate frequency signal by the plurality of chirp signals. The spatial displacement of the object may lead to a change in the round-trip delay of the chirp signal. The spatial displacement of the object does not affect the initial phase of the transmission chirp signal but affects a current phase of the reception chirp signal, and thus may affect the phase of the intermediate frequency signal.

A phase difference of the intermediate frequency signal can be expressed as [Equation 7].

$$\Delta_{\phi} = 2\pi f_0 \Delta t = 2\pi f_0 \frac{2\Delta d}{c} = \frac{4\pi}{\lambda_0} \cdot \Delta d \quad \text{[Equation 7]}$$

Here, ΔΦ denotes a phase difference of the intermediate frequency signal, $f_0$ denotes a start frequency of the chirp signal, $\lambda_0$ denotes a wavelength of the chirp signal, Δt denotes a change in the round-trip delay of the chirp signal, and Δd denotes a change in the round-trip distance, that is, the spatial displacement of the object.

When the object moves by Δd for the modulation time $T_c$, the speed of the moving object can be expressed as [Equation 8].

$$v = \frac{\lambda_0}{4\pi T_c} \cdot \Delta\phi \quad \text{[Equation 8]}$$

Here, v denotes a speed of the moving object, $\lambda_0$ denotes the wavelength of the chirp signal, $T_c$ denotes the modulation time, and ΔΦ denotes the phase difference of the intermediate frequency signal.

Figure 6:
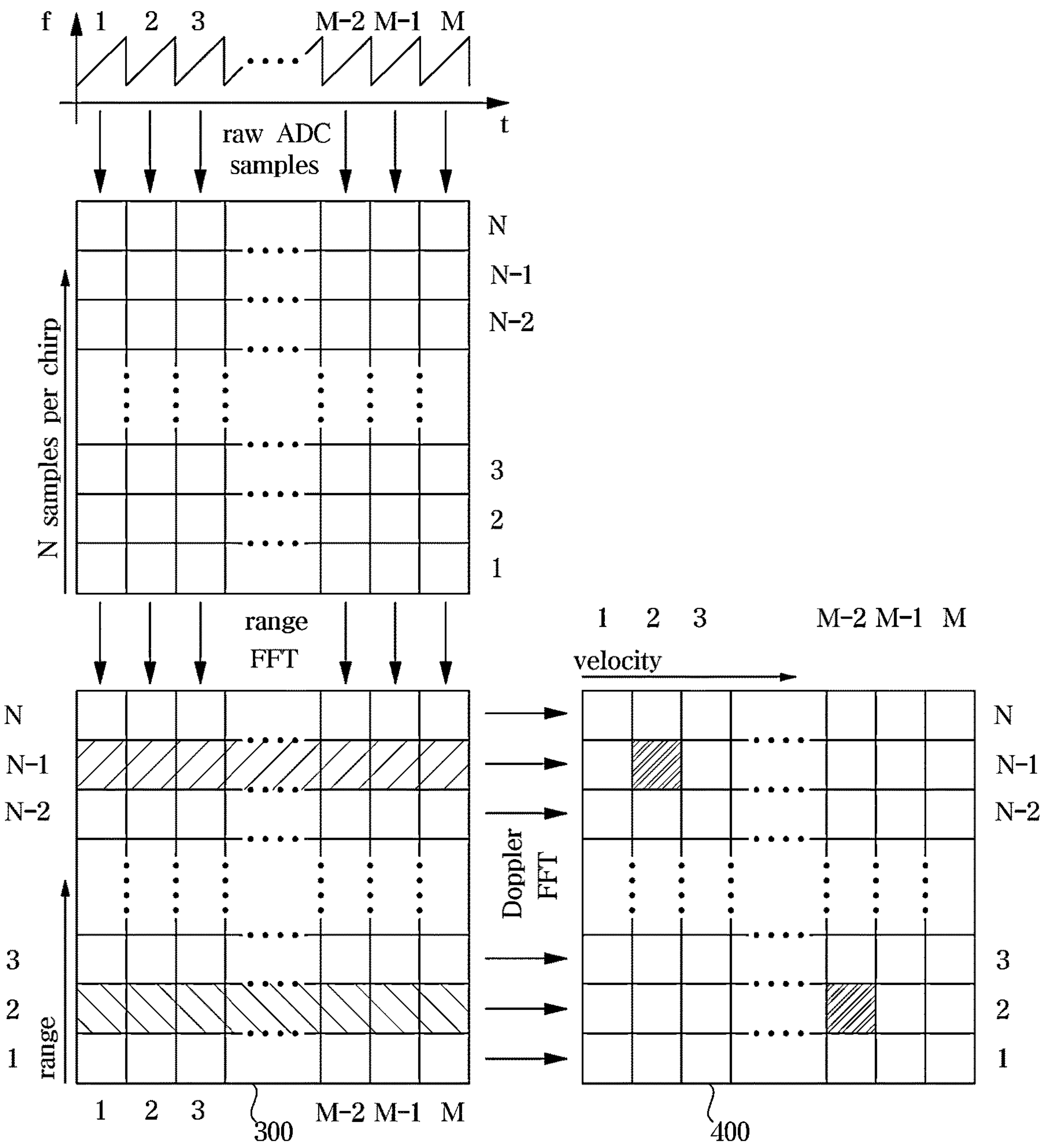
FIG. 6 is a view illustrating one example for processing an intermediate frequency signal of the apparatus for traveling assistance according to one embodiment.

FIG. 6 is a view illustrating one example for processing an intermediate frequency signal of the apparatus for traveling assistance according to one embodiment.

The signal processor 122 may process the digitized intermediate frequency signal using fast Fourier transform (FFT). The signal processor 122 may identify the intermediate frequency $f_b$ of the intermediate frequency signal and the phase difference ΔΦ of the intermediate frequency signal using the FFT. In addition, the signal processor 122 may identify the distance to the object based on the intermediate frequency $f_b$ of the intermediate frequency signal and the moving speed of the object based on the phase difference ΔΦ of the intermediate frequency signal.

The radar 120 may transmit the chirp signal including the plurality of chirps in order to identify the distance to the object and the moving speed of the object. For example, as illustrated in FIG. 6, the radar 120 may transmit a signal including M chirps.

The ADC 250 may sample the intermediate frequency signal N times while each chirp is transmitted and convert the sampled analog signal into a digital signal.

The signal processor 122 may transform the intermediate frequency signal digitized by the ADC 250 into a frequency domain signal through the FFT. Specifically, the signal processor 122 may transform an intermediate frequency signal corresponding to one chirp into a frequency domain signal through the FFT.

For example, as illustrated in FIG. 6, the signal processor 122 may transform an intermediate frequency signal corresponding to each of the M chirps into a frequency domain signal through the FFT When acquiring N pieces of sampling data of the intermediate frequency signal corresponding to one chirp, the signal processor 122 may transform the acquired sampling data into the frequency domain signal through the FFT. Therefore, the signal processor 122 may store only the N pieces of sampling data, and a memory capacity used for storing the sampling data can be minimized.

Hereinafter, the transforming of the intermediate frequency signal corresponding to each of the M chirps into the frequency domain signal through the FFT is referred to as "range FFT."

The signal processor 122 may acquire a frequency domain matrix 300 having peaks at intermediate frequencies $f_{b1}$ and $f_{b2}$ corresponding to the distance to the reflective object as illustrated in FIGS. 5A, 5B and 5C by performing the range FFT on the intermediate frequency signal corresponding to each of the M chirps. As described above, due to the frequency difference between the transmission chirp signal and the reception chirp signal caused by the delay of the reception chirp signal, the intermediate frequency signal having the peaks at the intermediate frequencies $f_{b1}$ and $f_{b2}$ may be acquired, and the frequency domain matrix 300 having the peaks at the intermediate frequencies $f_{b1}$ and $f_{b2}$ may be acquired.

Then, as illustrated in FIG. 6, the signal processor 122 may transform data of the frequency domain matrix 300, which has been acquired after performing the range FFT, through the FFT. Specifically, the signal processor 122 may transform a series of data, which correspond to the same frequency in the frequency domain matrix 300, through the FFT.

Hereinafter, the transforming of the series of data corresponding to the same frequency through the FFT is referred to as a "Doppler FFT."

The signal processor 122 may acquire a phase domain matrix 400 having a peak at the phase difference ΔΦ corresponding to the moving speed of the reflective object as illustrated in FIG. 6 by performing the Doppler FFT. As described above, the phase difference ΔΦ may occur between the M reception chirp signals due to the movement of the object, and the phase domain matrix 400 having the peak at each frequency corresponding to the phase difference ΔΦ may be acquired by the Doppler FFT performed on the frequency domain matrix 300.

The signal processor 122 may acquire the frequency domain matrix 300 by performing the range FFT on the intermediate frequency signal generated by the frequency mixing of the transmission chirp signal and the reception chirp signal. In addition, the signal processor 122 may acquire the phase domain matrix 400 by performing the Doppler FFT on the frequency domain matrix 300.

As described above, the range FFT may be performed on the sampling data sampled at the same chirp, and the Doppler FFT may be performed on the series of data corresponding to the same frequency. For example, as illustrated in FIG. 6, the range FFT may be performed on data in the same column, and the Doppler FFT may be performed on data in the same row.

Hereinafter, the performing of the range FFT on the data in the same column and the performing of the Doppler FFT on the data in the same row are collectively referred to as a "2-dimension FFT" The signal processor 122 may sample the N intermediate frequency signals and store the sampled signals to perform the range FFT. At this time, since the range FFT is performed on N pieces of sampling data corresponding to one chirp, a memory capable of storing the N pieces of sampling data may be used.

In addition, since the Doppler FFT is performed on the series of data corresponding to the same frequency of the frequency domain matrix 300 acquired as performing the range FFT, N pieces of frequency data are required for all M chirps to perform the Doppler FFT. Therefore, a memory capable of storing M×N frequency data may be used to perform the Doppler FFT.

Figure 7A:
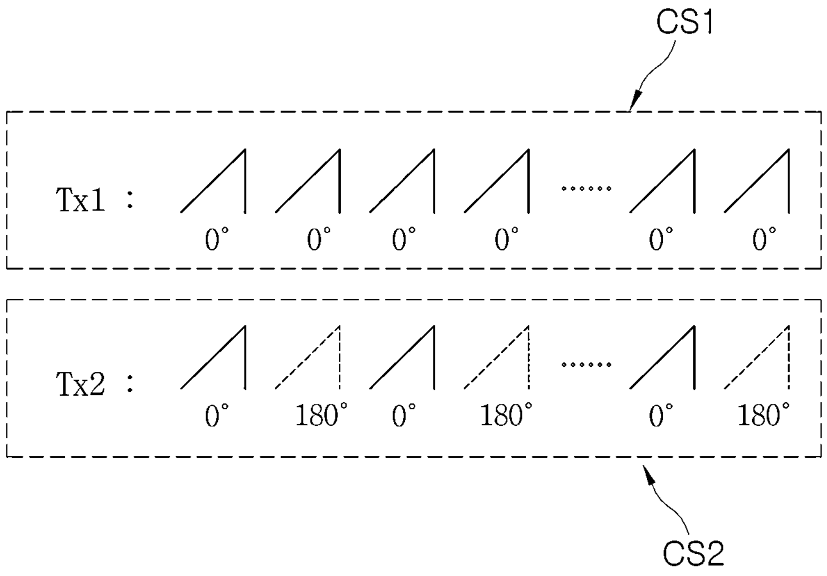
FIGS. 7A, 7B and 7C are a view illustrating one example of the transmission chirp signal, the transmission radio waves, and the processing of the intermediate frequency signal of the apparatus for traveling assistance according to one embodiment.
Figure 7B:
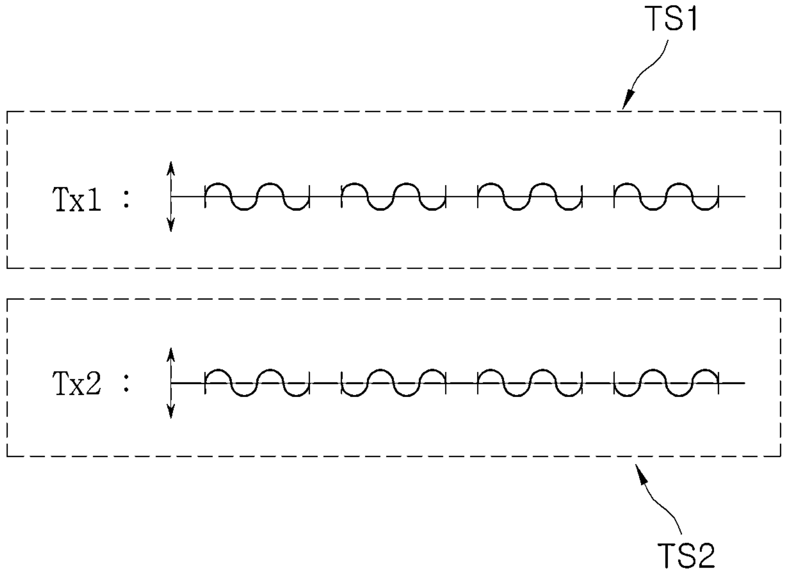
Figure 7C:
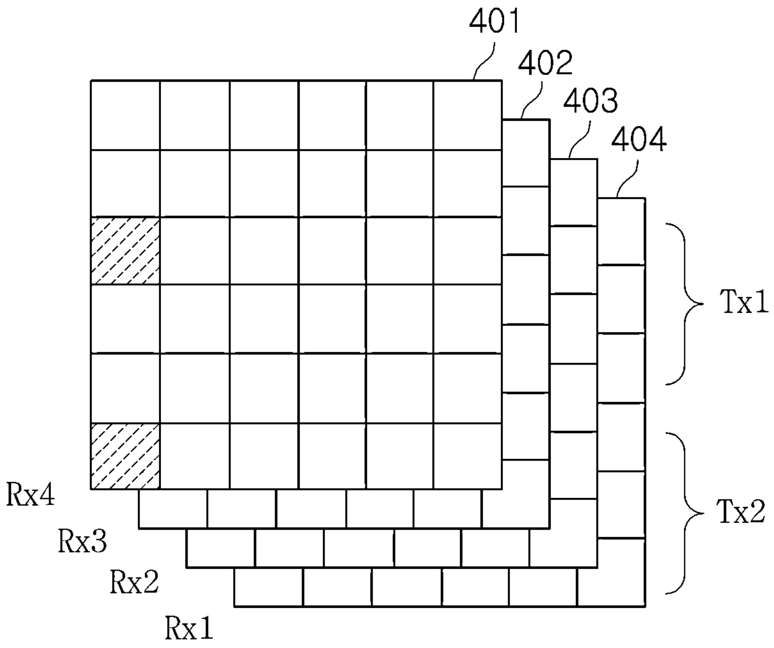
Figure 8A:
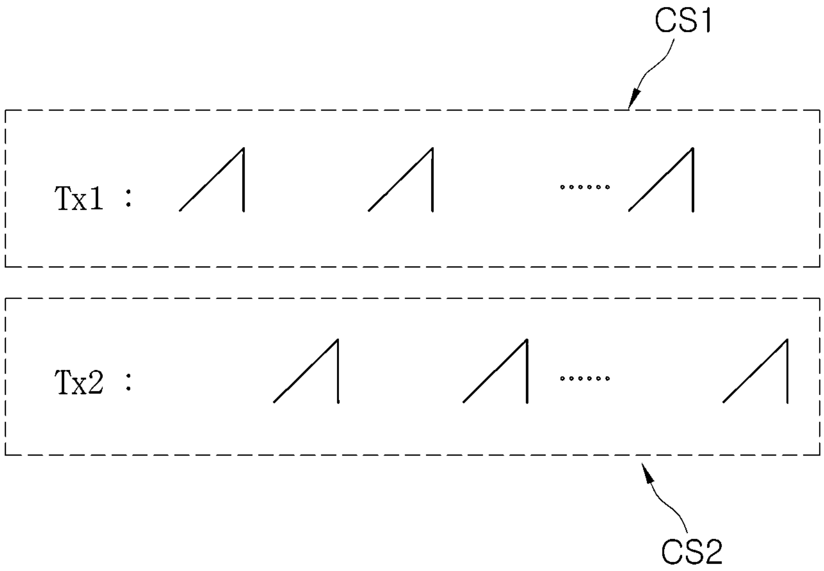
FIGS. 8A, 8B and 8C are a view illustrating another example of the transmission chirp signal, the transmission radio waves, and the processing of the intermediate frequency signal of the apparatus for traveling assistance according to one embodiment.
Figure 8B:
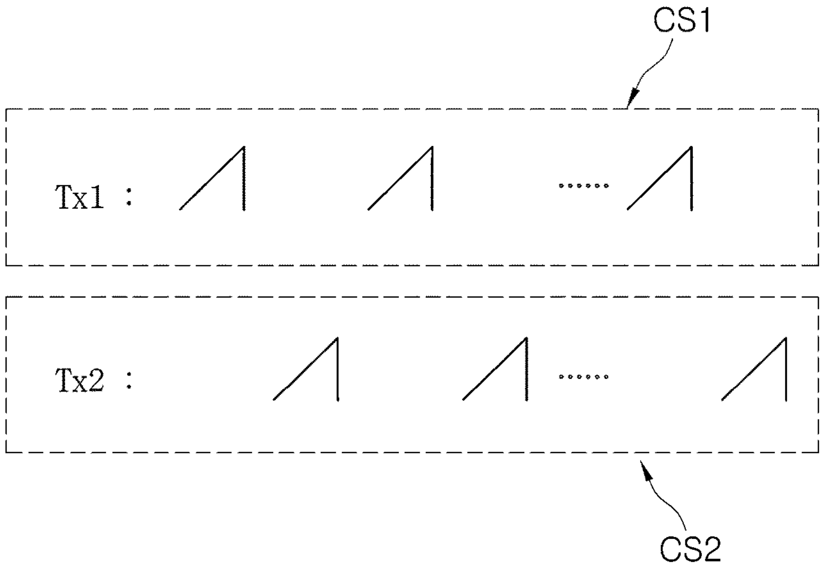
Figure 8C:
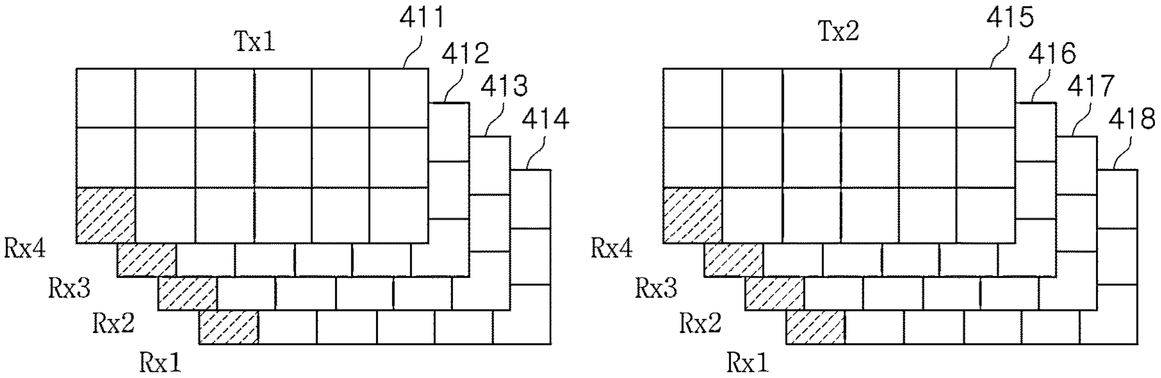

FIGS. 7A, 7B and 7C are a view illustrating one example of the transmission chirp signal, the transmission radio waves, and the processing of the intermediate frequency signal of the apparatus for traveling assistance according to one embodiment. FIGS. 8A, 8B and 8C are a view illustrating another example of the transmission chirp signal, the transmission radio waves, and the processing of the intermediate frequency signal of the apparatus for traveling assistance according to one embodiment.

Referring to FIGS. 7 and 8, the apparatus 100 for traveling assistance may include a plurality of transmission antennas Tx1 and Tx2 and a plurality of reception antennas Rx1 to Rx4. For example, the plurality of transmission antennas Tx1 and Tx2 may include the first transmission antenna Tx1 and the second transmission antenna Tx2. In addition, the plurality of reception antennas Rx1 to Rx4 may include the first reception antenna Rx1, the second reception antenna Rx2, the third reception antenna Rx3, and the fourth reception antenna Rx4.

The plurality of transmission antennas Tx1 and Tx2 may be disposed in a row at a predetermined interval, and the plurality of reception antennas Rx1 to Rx4 may be disposed in a row at predetermined intervals. In addition, the plurality of reception antennas Rx1 to Rx4 and the plurality of transmission antennas Tx1 and Tx2 may also be disposed in a row.

Each of the plurality of transmission antennas Tx1 and Tx2 may radiate transmission radio waves. At this time, the transmission radio waves radiated from the plurality of transmission antennas Tx1 and Tx2 may be phase-modulated so that the transmission radio waves radiated from the plurality of transmission antennas Tx1 and Tx2 may be distinguished.

For example, as illustrated in FIG. 7A, a first chirp signal CS1 and a second chirp signal CS2 may be simultaneously input to the first transmission antenna Tx1 and the second transmission antenna Tx2, respectively.

In addition, as illustrated in FIG. 7B, the first transmission antenna Tx1 and the second transmission antenna Tx2 may simultaneously radiate a first transmission signal TS1 and a second transmission signal TS2 according to the first chirp signal CS1 and the second chirp signal CS2.

At this time, the first transmission signal TS1 radiated from the first transmission antenna Tx1 may be radiated in the same phase without a phase difference.

The second transmission signal TS2 radiated from the second transmission antenna Tx2 may be radiated in a phase periodically shifted by 180 degrees. For example, the second transmission signal TS2 corresponding to the second chirp signal CS2 in a first period may be radiated without a phase difference, and the second transmission signal TS2 corresponding to the second chirp signal CS2 in a second period may be radiated in a phase shifted by 180 degrees. In addition, the second transmission signal TS2 corresponding to the second chirp signal CS2 in a third period may be radiated without a phase difference, and the second transmission signal TS2 corresponding to the second chirp signal CS2 in a fourth period may be radiated in a phase shifted by 180 degrees.

As described above, the first transmission antenna Tx1 may radiate a first transmission radio wave without a phase difference, and the second transmission antenna Tx2 may radiate a second transmission radio wave having a periodically-shifted phase.

Each of the plurality of reception antennas Rx1 to Rx4 may receive a first reflected radio wave by the first transmission signal TS1 and a second reflected radio wave by the second transmission signal TS2. Like the first transmission signal TS1, the first reflected radio wave has no phase difference, and the second reflected radio wave may have a phase periodically shifted by 180 degrees like the second transmission signal TS2.

The signal processor 122 of the radar 120 may distinguish the first reflected radio wave from the second reflected radio wave based on whether a phase has been shifted. That is, the signal processor 122 may distinguish the radio waves radiated from the first transmission antenna Tx1 from the radio waves radiated from the second transmission antenna Tx2.

In addition, the signal processor 122 of the radar 120 may acquire the first reflected radio wave and the second reflected radio wave from each of the plurality of reception antennas Rx1 to Rx4. For example, the signal processor 122 may acquire the first reflected radio wave and the second reflected radio wave from the first reception antenna Rx1, acquire the first reflected radio wave and the second reflected radio wave from the second reception antenna Rx2, acquire the first reflected radio wave and the second reflected radio wave from the third reception antenna Rx3, and acquire the first reflected radio wave and the second reflected radio wave from the fourth reception antenna Rx4.

The signal processor 122 may integrally process the first reflected radio wave and the second reflected radio wave acquired from each of the plurality of reception antennas Rx1 to Rx4. For example, the signal processor 122 may integrally perform a 2-dimensional FFT on the first reflected radio wave and the second reflected radio wave acquired from each of the plurality of reception antennas Rx1 to Rx4. As performing the 2-dimension FFT, four phase domain matrices 401, 402, 403, and 404 may be acquired as illustrated in FIG. 7C.

In addition, the transmission radio waves radiated from the plurality of transmission antennas Tx1 and Tx2 may be time-modulated so that the transmission radio waves radiated from the plurality of transmission antennas Tx1 and Tx2 may be distinguished.

For example, as illustrated in FIG. 8A, the first chirp signals CS1 and the second chirp signals CS2 may be alternately input to the first transmission antenna Tx1 and the second transmission antenna Tx2.

In addition, as illustrated in FIG. 8B, the first transmission antenna Tx1 and the second transmission antenna Tx2 may alternately radiate the first transmission signal TS1 and the second transmission signal TS2 according to the first chirp signals CS1 and the second chirp signals CS2.

Each of the plurality of reception antennas Rx1 to Rx4 may alternately receive the first reflected radio wave by the first transmission signal TS1 and the second reflected radio wave by the second transmission signal TS2.

The signal processor 122 of the radar 120 may distinguish the first reflected radio wave from the second reflected radio wave based on time points at which the radio waves have been received. That is, the signal processor 122 may distinguish the radio waves radiated from the first transmission antenna Tx1 from the radio waves radiated from the second transmission antenna Tx2.

The signal processor 122 may separately process the first reflected radio wave and the second reflected radio wave acquired from each of the plurality of reception antennas Rx1 to Rx4. For example, the signal processor 122 may separately perform the 2-dimensional FFT on the first reflected radio wave and the second reflected radio wave acquired from each of the plurality of reception antennas Rx1 to Rx4. As performing the 2-dimension FFT, eight phase domain matrices 411, 412, 413, 414, 415, 416, 417, and 418 may be acquired as illustrated in FIG. 8C.

Figure 9A:
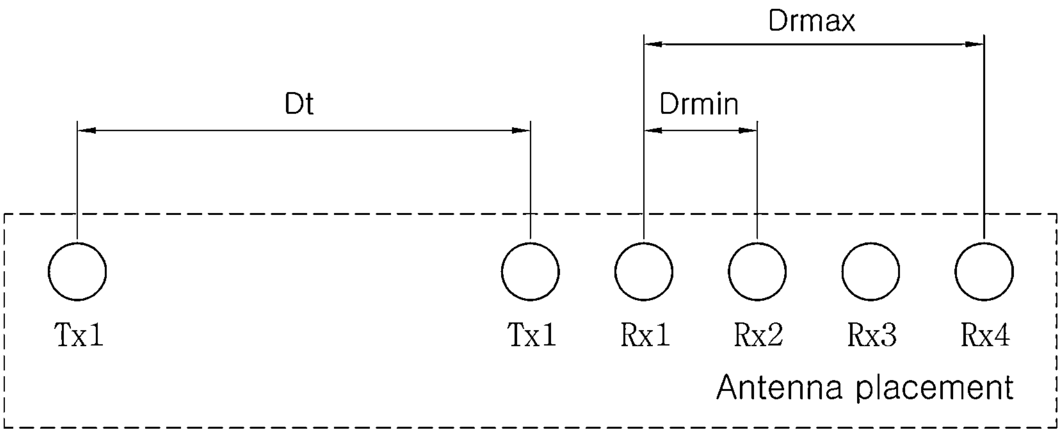
FIGS. 9A and 9B are a view illustrating one example of an arrangement of a plurality of transmission antennas and a plurality of reception antennas of the apparatus for traveling assistance according to one embodiment.
Figure 9B:
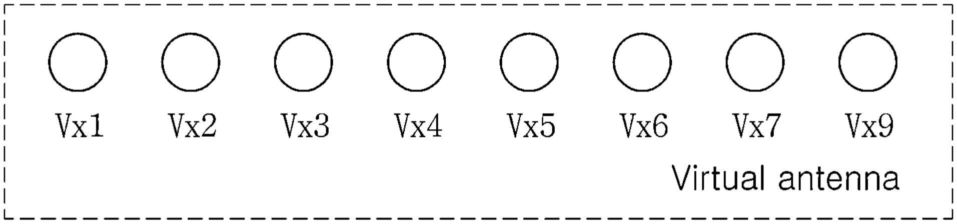
Figure 10A:
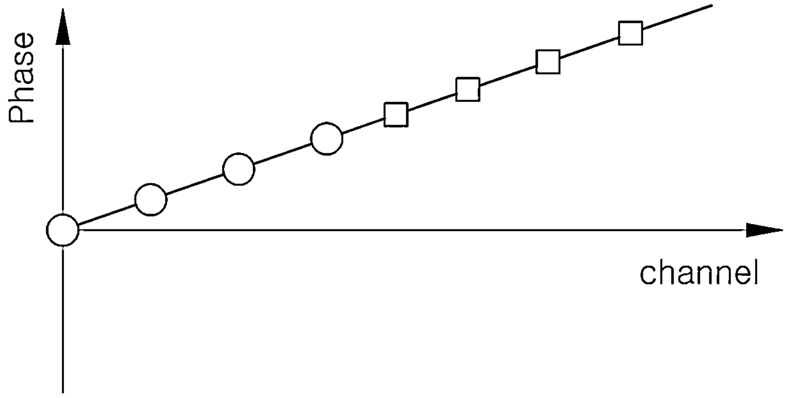
FIGS. 10A and 10B are a view illustrating phases of reflected radio waves received by a plurality of virtual antennas of the apparatus for traveling assistance according to one embodiment.
Figure 10B:
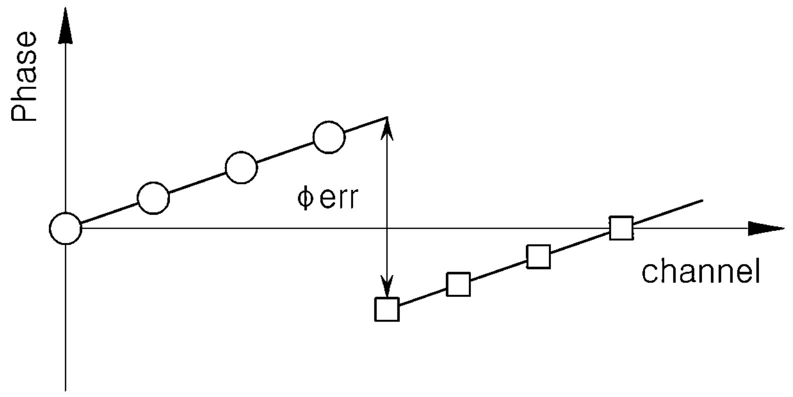

FIGS. 9A and 9B are a view illustrating one example of the arrangement of a plurality of transmission antennas and a plurality of reception antennas of the apparatus for traveling assistance according to one embodiment. FIGS. 10A and 10B are a view illustrating phases of reflected radio waves received by a plurality of virtual antennas of the apparatus for traveling assistance according to one embodiment.

Referring to FIGS. 9A and 9B, the radar 120 may include the plurality of transmission antennas Tx1 and Tx2 and the plurality of reception antennas Rx1 to Rx4. Therefore, the radar 120 may have high resolution.

As illustrated in FIG. 9A, the plurality of transmission antennas Tx1 and Tx2 and the plurality of reception antennas Rx1 to Rx4 may be disposed in a row.

A distance between the plurality of transmission antennas Tx1 and Tx2 and distances between the plurality of reception antennas Rx1 to Rx4 may depend on wavelengths of the transmission radio waves and the reflected radio waves.

The distance between the plurality of transmission antennas Tx1 and Tx2 may be greater than the distances between the plurality of reception antennas Rx1 to Rx4. A minimum distance Dt between the plurality of transmission antennas Tx1 and Tx2 may be greater than a maximum distance Drmax between the plurality of reception antennas Rx1 to Rx4. For example, the minimum distance Dt between the plurality of transmission antennas Tx1 and Tx2 may correspond to a product of a minimum distance Drmin between the plurality of reception antennas Rx1 to Rx4 and the number of reception antennas Rx1 to Rx4.

Depending on the arrangement between the plurality of transmission antennas Tx1 and Tx2 and the plurality of reception antennas Rx1 to Rx4, the plurality of reception antennas Rx1 to Rx4 may be virtualized. For example, as illustrated in FIG. 9B, the radar 120 may detect an object (target) in the same manner as a plurality of virtual antennas Vx1 to Vx8 receive reflected signals.

The number of virtual antennas Vx1 to Vx8 may correspond to a product of the number of transmission antennas Tx1 and Tx2 and the number of reception antennas Rx1 to Rx4.

Each of the plurality of virtual antennas Vx1 to Vx8 may correspond to a pair formed by each of the plurality of transmission antennas Tx1 and Tx2 and each of the plurality of reception antennas Rx1 to Rx4. The first virtual antenna Vx1 may correspond to a pair of the first transmission antenna Tx1 and the first reception antenna Rx1, the second virtual antenna Vx2 may correspond to a pair of the first transmission antenna Tx1 and the second reception antenna Rx2, the third virtual antenna Vx3 may correspond to a pair of the first transmission antenna Tx1 and the third reception antenna Rx3, and the fourth virtual antenna Vx4 may correspond to a pair of the first transmission antenna Tx1 and the fourth reception antenna Rx4. In addition, the fifth virtual antenna Vx5 may correspond to a pair of the second transmission antenna Tx2 and the first reception antenna Rx1, the sixth virtual antenna Vx6 may correspond to a pair of the second transmission antenna Tx2 and the second reception antenna Rx2, the seventh virtual antenna Vx7 may correspond to a pair of the second transmission antenna Tx2 and the third reception antenna Rx3, and the eighth virtual antenna Vx8 may correspond to a pair of the second transmission antenna Tx2 and the fourth reception antenna Rx4.

Reflected radio waves received from the plurality of virtual antennas Vx1 to Vx8 may be processed by the signal processor 122 of the radar 120.

At this time, the reflected radio waves received by the plurality of virtual antennas Vx1 to Vx8 may be divided into a plurality of channels according to the transmission antennas. For example, the reflected radio wave by the first transmission antenna Tx1 may belong to a first channel, and the reflected radio wave by the second transmission antenna Tx2 may belong to a second channel.

Sub-signals received by the plurality of virtual antennas Vx1 to Vx8 may have different phases according to positions of the plurality of transmission antennas Tx1 and Tx2 and the plurality of reception antennas Rx1 to Rx4. Phase differences between the sub-signals received by the plurality of virtual antennas Vx1 to Vx8 may correspond to a position of the object (target).

A phase difference may occur between the sub-signals received by each of the plurality of virtual antennas Vx1 to Vx8 according to a distance between each of the plurality of virtual antennas Vx1 to Vx8 and the object (target). For example, a phase of a sub-signal received by a virtual antenna having a long distance to the object (target) may be delayed (or greater) than a phase of a sub-signal received by a virtual antenna having a short distance to the object (target).

Therefore, the phases of the sub-signals received by the plurality of virtual antennas Vx1 to Vx8 may substantially linearly vary as illustrated in FIG. 10A.

For example, the sub-signals received by the plurality of virtual antennas Vx1 to Vx8 may be expressed as steering vectors $\vec{a}_{tx_1}(\theta_t)$ and $\vec{a}_{tx_2}(\theta_t)$ as in Equations 9 and 10.

$$\vec{a}_{tx_1}(\theta_t) = \begin{bmatrix} \exp(j\phi_0) \\ \exp(j(\phi_0 + \omega_0)) \\ \vdots \\ \exp(j(\phi_0 + \omega_{L-1})) \end{bmatrix} \quad \text{[Equation 9]}$$

Here, $\vec{a}_{tx_1}(\theta_t)$ denotes a steering vector of the sub-signal of the first channel associated with the first transmission antenna, $\Phi_0$ denotes a reference phase of the sub-signal received by the virtual antenna, and $\omega_0$ to $\omega_{L-1}$ denotes phase differences between the sub-signals received by the virtual antenna.

$$\vec{a}_{tx_2}(\theta_t) = \begin{bmatrix} \exp(j(\phi_0 + \omega_L)) \\ \exp(j(\phi_0 + \omega_{L+1})) \\ \vdots \\ \exp(j(\phi_0 + \omega_{2L-1})) \end{bmatrix} \quad \text{[Equation 10]}$$

Here, $\vec{a}_{tx_2}(\theta_t)$ denotes a steering vector of the sub-signal of the second channel associated with the second transmission antenna, $\Phi_0$ denotes the reference phase of the sub-signal received by the virtual antenna, and $\omega_L$ to $\omega_{2L-1}$ denotes phase differences between the sub-signals received by the virtual antenna.

As described above, the phases of the sub-signals received by the plurality of virtual antennas Vx1 to Vx8 may substantially linearly vary.

At this time, a phase difference $\Phi_{err}$ may occur between the transmission radio waves radiated by the plurality of transmission antennas Tx1 and Tx2 due to various causes. For example, the phase difference $\Phi_{err}$ may occur between the first transmission radio wave radiated from the first transmission antenna Tx1 and the second transmission radio wave radiated from the second transmission antenna Tx2.

Therefore, the phases of the sub-signals received by the plurality of virtual antennas Vx1 to Vx8 may vary non-linearly as illustrated in FIG. 10B. Specifically, phases of sub-signals belonging to the same channel linearly vary, but phases of sub-signals belonging to different channels may non-linearly vary.

For example, the sub-signals received by the plurality of virtual antennas Vx1 to Vx8 may be expressed as steering vectors $\vec{a}_{tx_1}(\theta_t)$ and $\vec{a}_{tx_2}(\theta_t)$ as in Equations 11 and 12.

$$\vec{a}_{tx_1}(\theta_t) = \begin{bmatrix} \exp(j\phi_0) \\ \exp(j(\phi_0 + \omega_0)) \\ \vdots \\ \exp(j(\phi_0 + \omega_{L-1})) \end{bmatrix} \quad \text{[Equation 11]}$$

Here, $\vec{a}_{tx_1}(\theta_t)$ denotes the steering vector of the sub-signal of the first channel associated with the first transmission antenna, $\Phi_0$ denotes the reference phase of the sub-signal received by the virtual antenna, and $\omega_0$ to $\omega_{L-1}$ denotes the phase differences between the sub-signals received by the virtual antenna.

$$\vec{a}_{tx_2}(\theta_t) = \begin{bmatrix} \exp(j(\phi_0 + \omega_L)) \\ \exp(j(\phi_0 + \omega_{L+1})) \\ \vdots \\ \exp(j(\phi_0 + \omega_{2L-1})) \end{bmatrix} \quad \text{[Equation 12]}$$

Here, $\vec{a}_{tx_2}(\theta_t)$ denotes the steering vector of the sub-signal of the second channel associated with the second transmission antenna, $\Phi_0$ denotes the reference phase of the sub-signal received by the virtual antenna, $\Phi_{err}$ denotes the phase difference between the first transmission signal and the second transmission signal, and $\omega_L$ to $\omega_{2L-1}$ denotes the phase differences between the sub-signals received by the virtual antenna.

As described above, the phase difference between the first transmission signal and the second transmission signal may cause non-linearity of the sub-signal received by the virtual antenna, thereby causing an error in identifying the position of the object (target).

The radar 120 may compensate for the phase difference between the first transmission signal and the second transmission signal in order to overcome the error in identifying the position of the object (target).

Figure 11A:
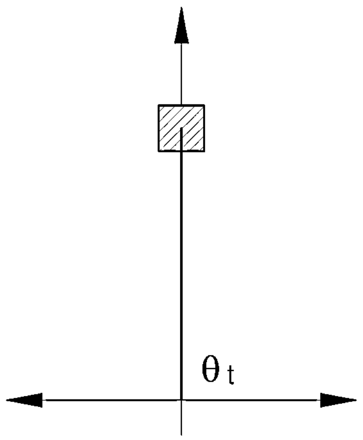
FIGS. 11A and 11B are a view illustrating one example for identifying a phase difference between transmission signals by the apparatus for traveling assistance according to one embodiment.
Figure 11B:
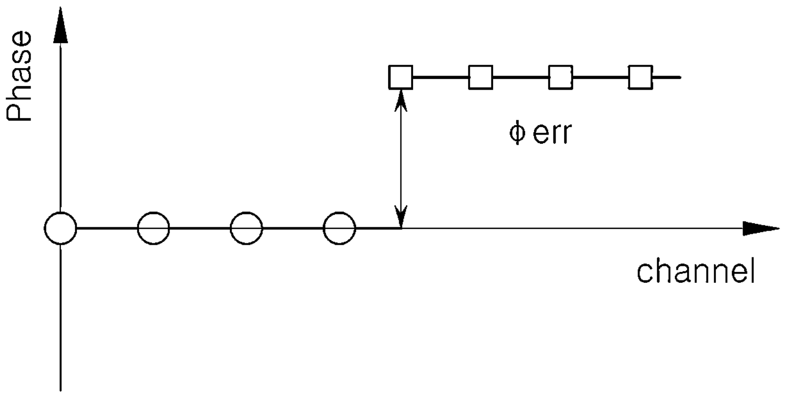

FIGS. 11A and 11B are a view illustrating one example for identifying a phase difference between transmission signals by the apparatus for traveling assistance according to one embodiment.

As illustrated in FIG. 11A, a single object may be positioned in a traveling direction of the vehicle 1. Therefore, as illustrated in FIG. 11B, the phase difference between the sub-signals belonging to the same channel may not occur.

For example, the sub-signals received by the plurality of virtual antennas Vx1 to Vx8 may be expressed as steering vectors $\vec{a}_{tx_1}(0)$ and $\vec{a}_{tx_2}(0)$ as in Equations 13 and 14.

$$\vec{a}_{tx_1}(0) = \begin{bmatrix} \exp(j\phi_0) \\ \exp(j(\phi_0)) \\ \vdots \\ \exp(j(\phi_0)) \end{bmatrix} \quad \text{[Equation 13]}$$

Here, $\vec{a}_{tx_1}(0)$ denotes the steering vector of the sub-signal of the first channel associated with the first transmission antenna, and $\Phi_0$ denotes the reference phase of the sub-signal received by the virtual antenna.

$$\vec{a}_{tx_2}(0) = \begin{bmatrix} \exp(j(\phi_0 + \phi_{err}) \\ \exp(j(\phi_0 + \phi_{err})) \\ \vdots \\ \exp(j(\phi_0 + \phi_{err})) \end{bmatrix} \quad \text{[Equation 14]}$$

Here, $\vec{a}_{tx_1}(0)$ denotes the steering vector of the sub-signal of the second channel associated with the second transmission antenna, $\Phi_0$ denotes the reference phase of the sub-signal received by the virtual antenna, and $\Phi_{err}$ denotes the error between the first transmission signal and the second transmission signal.

The signal processor 122 may identify the phase difference $\Phi_{err}$ between the first transmission signal and the second transmission signal based on the phase difference between the steering vector of the sub-signal of the first channel and the steering vector of the sub-signal of the second channel.

Figure 12A:
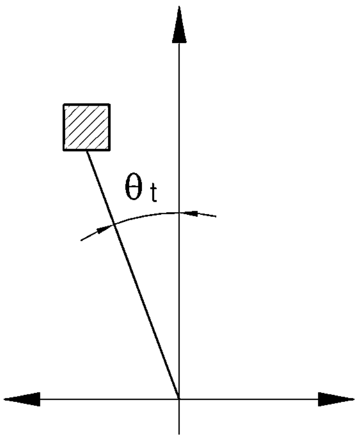
FIGS. 12A, 12B and 12C are a view illustrating another example for identifying a phase difference between transmission signals by the apparatus for traveling assistance according to one embodiment.
Figure 12B:
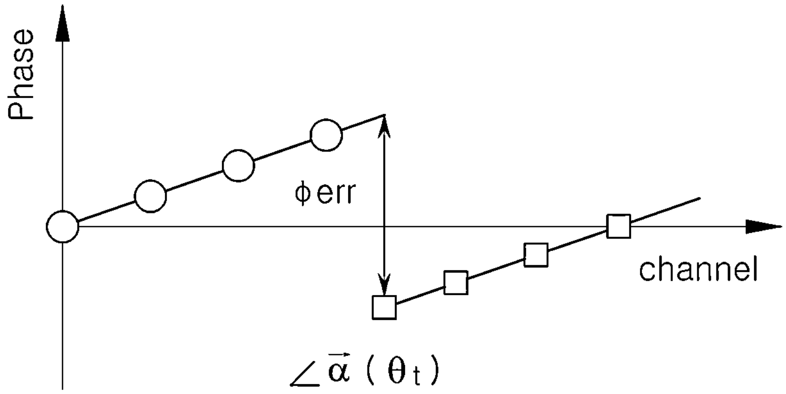
Figure 12C:
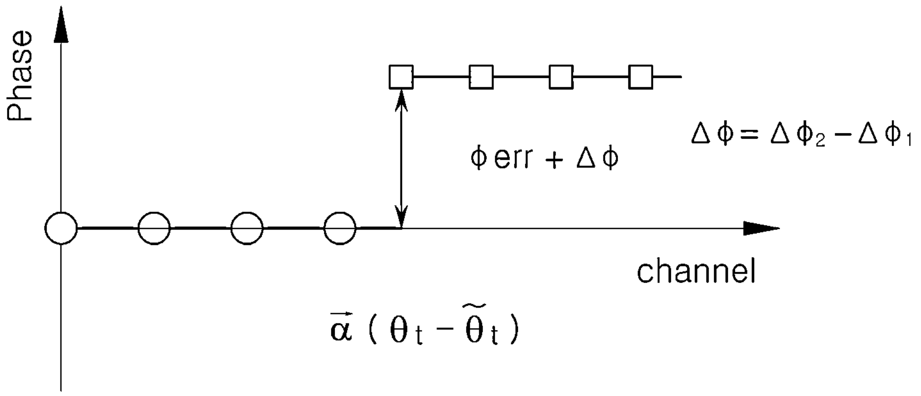

FIGS. 12A, 12B and 12C are a view illustrating another example for identifying a phase difference between transmission signals by the apparatus for traveling assistance according to one embodiment.

As illustrated in FIG. 12A, a single object may be positioned to be displaced at a target angle $\theta_t$ in the traveling direction of the vehicle 1. Therefore, a phase difference corresponding to the target angle $\theta_t$ may occur between sub-signals belonging to the same channel illustrated in FIG. 12B.

For example, the sub-signals received by the plurality of virtual antennas Vx1 to Vx8 may be expressed as steering vectors $\vec{a}_{tx_1}(\theta_t)$ and $\vec{a}_{tx_2}(\theta_t)$ as in Equations 11 and 12.

The signal processor 122 may estimate the position of the object (target). The signal processor 122 may identify an estimated angle $\tilde{\theta}_t$ based on the estimated position. The signal processor 122 may subtract a phase corresponding to the estimated angle $\tilde{\theta}_t$ from the phase of the steering vector of the sub-signal belonging to each channel.

The sub-signals whose phases corresponding to the estimated angle $\tilde{\theta}_t$ have been subtracted can be expressed as steering vectors $\vec{a}_{tx_1}(\theta_t - \tilde{\theta}_t)$ and $\vec{a}_{tx_2}(\theta_t - \tilde{\theta}_t)$ as in Equations 15 and 16.

$$\vec{a}_{tx_1}(\theta_t - \tilde{\theta}_t) = \begin{bmatrix} \exp(j(\phi_0 + \Delta\phi_1)) \\ \exp(j(\phi_0 + \Delta\phi_1)) \\ \vdots \\ \exp(j(\phi_0 + \Delta\phi_1)) \end{bmatrix} \quad \text{[Equation 15]}$$

Here, $\vec{a}_{tx_1}(\theta_t - \tilde{\theta}_t)$ denotes a steering vector of a sub-signal of a first channel whose phase corresponding to the estimated angle has been subtracted, $\Phi_0$ denotes the reference phase of the sub-signal received by the virtual antenna, and $\Delta\Phi_1$ denotes a phase difference between the sub-signal whose phase corresponding to the estimated angle has been subtracted and an original sub-signal.

$$\vec{a}_{tx_2}(\theta_t - \tilde{\theta}_t) = \begin{bmatrix} \exp(j(\phi_0 + \phi_{err} + \Delta\phi_2)) \\ \exp(j(\phi_0 + \phi_{err} + \Delta\phi_2)) \\ \vdots \\ \exp(j(\phi_0 + \phi_{err} + \Delta\phi_2)) \end{bmatrix} \quad \text{[Equation 16]}$$

Here, $\vec{a}_{tx_2}(\theta_t - \tilde{\theta}_t)$ denotes a steering vector of a sub-signal of a second channel whose the phase corresponding to the estimated angle has been subtracted, $\Phi_0$ denotes the reference phase of the sub-signal received by the virtual antenna, $\Phi_{err}$ denotes the phase difference between the first transmission signal and the second transmission signal, and $\Delta\Phi_2$ denotes a phase difference between the sub-signal whose phase corresponding to the estimated angle has been subtracted and the original sub-signal.

The signal processor 122 may determine whether the phase difference between the steering vectors of the sub-signals belonging to the same channel is in an allowable error range. When the phase difference between the steering vectors of the reflected signals belonging to the same channel is in the allowable error range, the signal processor 122 may identify a phase difference ($\Phi_{err}+\Delta\Phi_2-\Delta\Phi_1$) between the steering vectors of the sub-signals belonging to different channels.

The signal processor 122 may identify the phase difference ($\Phi_{err}+\Delta\Phi_2-\Delta\Phi_1$) between the steering vectors of the sub-signals belonging to different channels as a phase difference $\Phi_{diff}$ between the sub-signals belonging to different channels.

The signal processor 122 may calculate a cumulative average of the phase difference $\Phi_{diff}$ between the sub-signals belonging to different channels.

The signal processor 122 may compensate for the phase difference between the sub-signals belonging to different channels using the cumulative average of the phase difference diff between the sub-signals.

Figure 13:
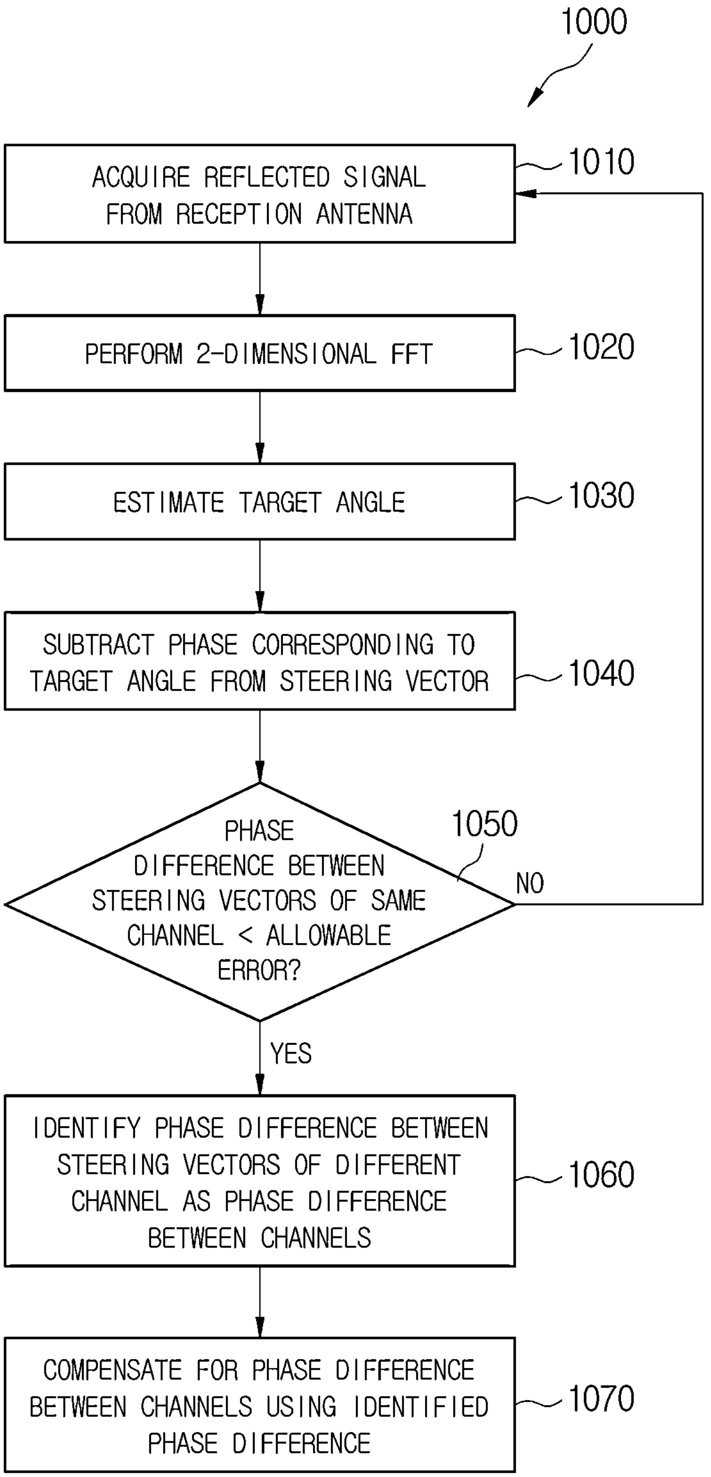
FIG. 13 is a view illustrating a method of identifying a phase difference between transmission signals by the apparatus for traveling assistance according to one embodiment.

FIG. 13 is a view illustrating a method of identifying a phase difference between transmission signals by the apparatus for traveling assistance according to one embodiment.

The apparatus 100 for traveling assistance may acquire the reflected signals from the plurality of reception antennas Rx1 to Rx4 (1010).

The apparatus 100 for traveling assistance may perform the 2-dimensional FFT on the received reflected signals (1020).

The apparatus 100 for traveling assistance may estimate the target angle to the object (target) (1030).

The apparatus 100 for traveling assistance may subtract the phase corresponding to the target angle from the steering vector of the reflected signal (1040).

The apparatus 100 for traveling assistance may identify whether the subtracted phase difference between the steering vectors of the same channel is smaller than the allowable error (1050).

When the subtracted phase difference between the steering vectors of the same channel is not smaller than the allowable error (No in 1050), the apparatus 100 for traveling assistance may acquire the reflected signals from the plurality of reception antennas Rx1 to Rx4.

When the subtracted phase difference between the steering vectors of the same channel is smaller than the allowable error (Yes in 1050), the apparatus 100 for traveling assistance may identify the phase difference between the steering vectors of different channels as the phase difference between the channels (1060).

The apparatus 100 for traveling assistance may compensate for the phase difference between the channel signals using the identified phase difference (1070).

As is apparent from the above description, it is possible to provide an apparatus including a radar and a method of controlling the same. Therefore, it is possible to correct a phase error of a radar signal.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:

a radar installed on a vehicle, having a sensing area outside the vehicle, and configured to provide object data; and a controller configured to identify a distance to an object around the vehicle and a moving speed of the object based on processing the object data, wherein the radar comprises:

a plurality of transmission antennas;

a plurality of reception antennas; and a signal processor configured to provide transmission signals to the plurality of transmission antennas to transmit a plurality of transmission radio waves including a first transmission radio wave and a second transmission radio wave and acquire a plurality of reception signals including first sub-signals corresponding to the first transmission radio wave and second sub-signals corresponding to the second transmission radio wave received by the plurality of reception antennas, and the signal processor is configured to:

determine an angle to the object based on at least two signals of the plurality of reception signals;

subtract a phase corresponding to the angle to the object from phases of the plurality of reception signals;

identify whether each of a phase error of first phases of the first sub-signals and a phase error of second phases of the second sub-signals is smaller than a predetermined allowable error;

identify a phase error between the plurality of transmission radio waves by identifying a phase difference between first phases of the first sub-signals and second phases of the second sub-signals based on a plurality of phase-subtracted signals including the subtracted phases; and correct the phases of the plurality of reception signals based on the identified phase error between the plurality of transmission radio waves.

2. The apparatus of claim 1, wherein a minimum distance between the plurality of transmission antennas is greater than a maximum distance between the plurality of reception antennas.

3. The apparatus of claim 1, wherein the transmission signals transmitted from the plurality of transmission antennas are phase-modulated or time-modulated.

4. The apparatus of claim 1, wherein the plurality of transmission antennas radiate transmission signals whose frequencies linearly vary in response to a chirp signal, and the plurality of reception antennas receive reflected signals reflected from the object.

5. The apparatus of claim 4, wherein the radar further includes a signal processing circuit configured to provide an intermediate frequency signal, which has been generated based on mixing the transmission signal and the reception signal, to the signal processor.

6. The apparatus of claim 5, wherein the signal processor is configured to:

transform the intermediate frequency signal into frequency domain data using a first fast Fourier transform; and transform the frequency domain data into phase domain data using a second fast Fourier transform.

7. A method of controlling an apparatus for driver assistance including a radar having a plurality of transmission antennas and a plurality of reception antennas, the method comprising:

providing transmission signals to the plurality of transmission antennas to transmit a plurality of transmission radio waves including a first transmission radio wave and a second transmission radio wave;

acquiring a plurality of reception signals including first sub-signals corresponding to the first transmission radio wave and second sub-signals corresponding to the second transmission radio wave received by the plurality of reception antennas;

determining an angle to an object based on at least two signals of the plurality of reception signals;

subtracting a phase corresponding to the angle to the object from phases of the plurality of reception signals;

identifying whether each of a phase error of first phases of the first sub-signals and a phase error of second phases of the second sub-signals is smaller than a predetermined allowable error;

identifying a phase error between the plurality of transmission radio waves by identifying a phase difference between first phases of the first sub-signals and second phases of the second sub-signals based on a plurality of phase-subtracted signals including the subtracted phases; and correcting the phases of the plurality of reception signals based on the identified phase error between the plurality of transmission radio waves.

8. The method of claim 7, wherein a minimum distance between the plurality of transmission antennas is greater than a maximum distance between the plurality of reception antennas.

9. The method of claim 7, further comprising phase-modulating or time-modulating the transmission signals transmitted from the plurality of transmission antennas.

10. The method of claim 7, further comprising:

radiating, by the plurality of transmission antennas, the transmission signals whose frequencies linearly vary in response to a chirp signal; and receiving, by the plurality of reception antennas, reflected signals reflected from the object.

11. The method of claim 10, further comprising providing an intermediate frequency signal generated based on mixing the transmission signal and the reception signal.

12. The method of claim 11, further comprising:

transforming the intermediate frequency signal into frequency domain data using a first fast Fourier transform; and transforming the frequency domain data into phase domain data using a second fast Fourier transform.

* * * * *